March 1, 1927.
F. C. HOLTZ
1,619,473
MAXIMUM DEMAND METER
Filed May 23, 1921
2 Sheets-Sheet 1
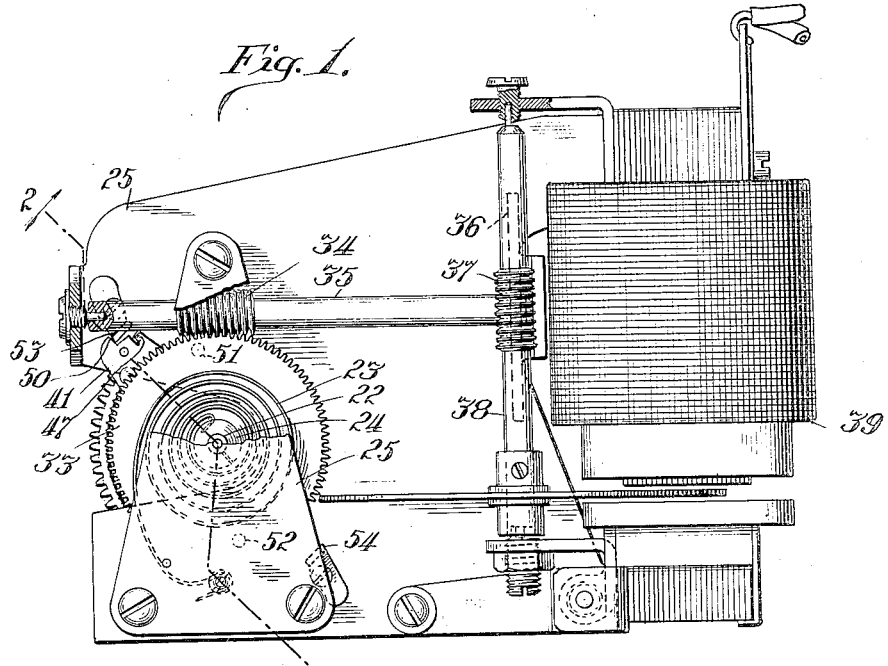
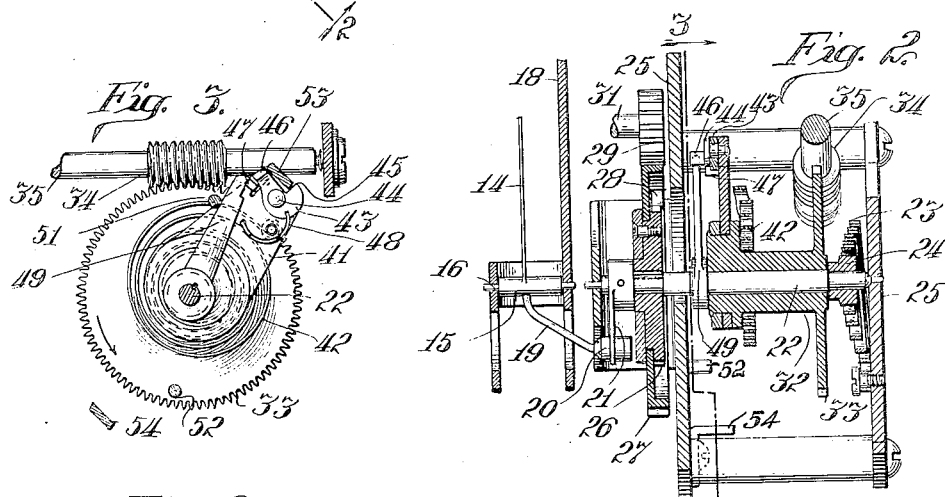
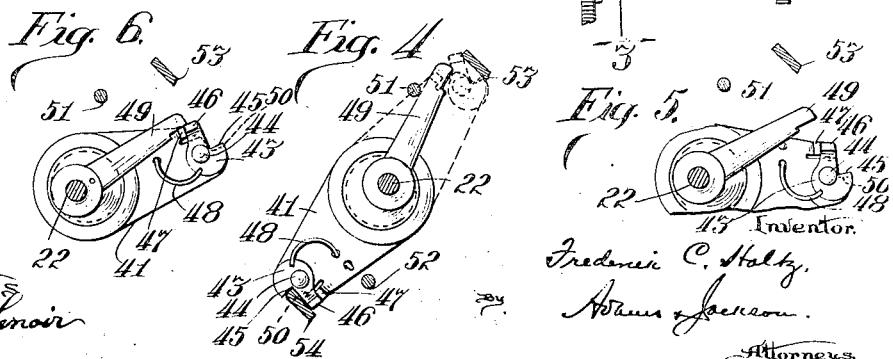
Inventor
Frederick C. Holtz,
Adams & Jackson,
Attorneys
Witness
Milton Lenoir March 1, 1927. 1,619,473
F. C. HOLTZ
MAXIMUM DEMAND METER
Filed May 23, 1921 2 Sheets-Sheet 2
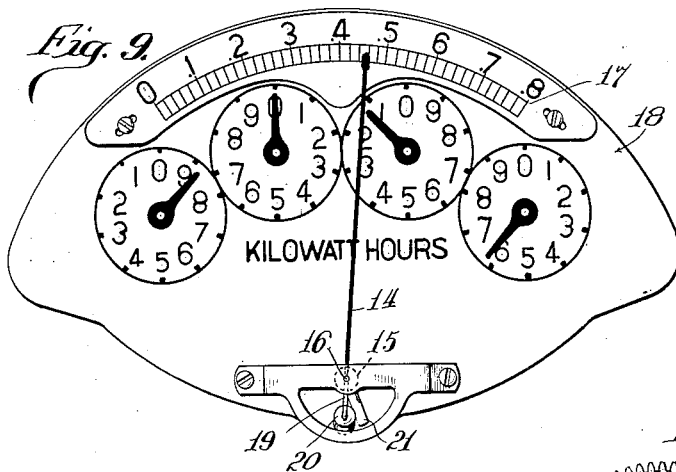
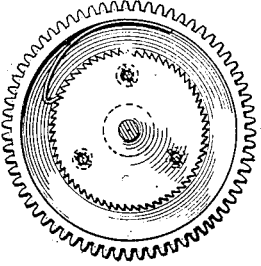
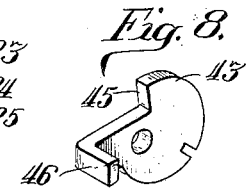
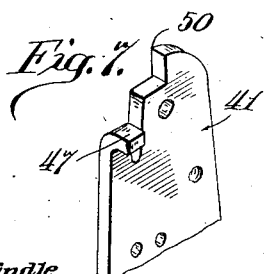
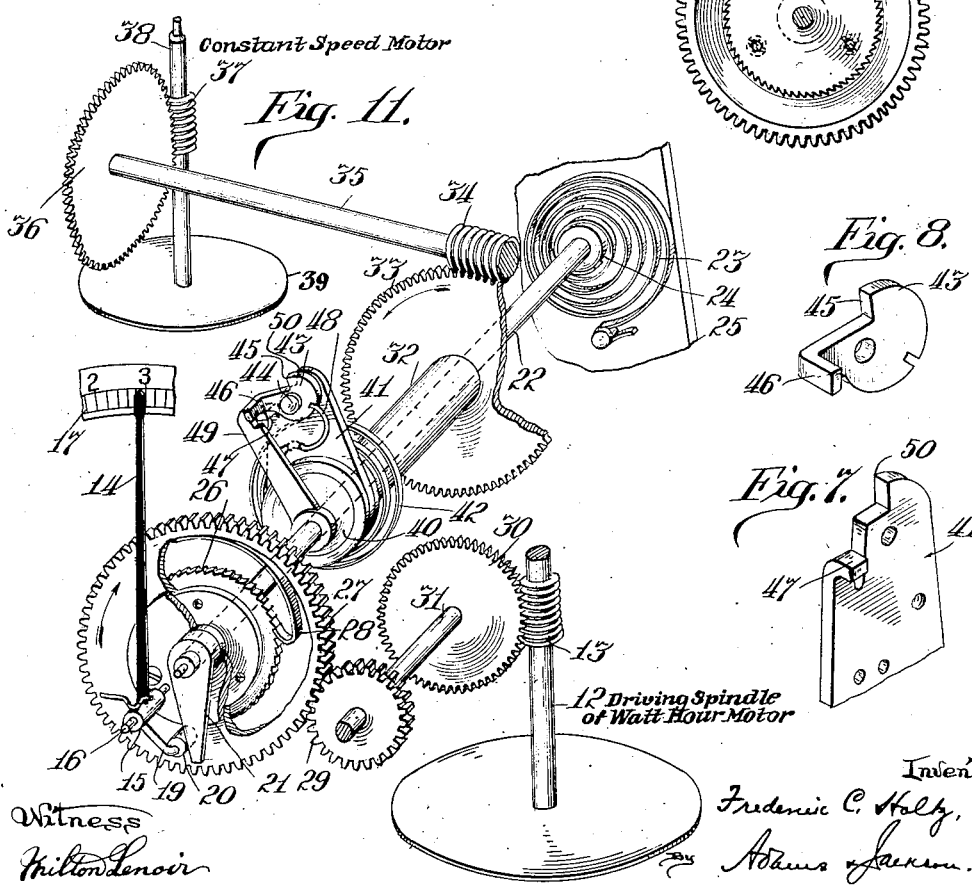

Patented Mar. 1, 1927.

1,619,473

UNITED STATES PATENT OFFICE.

FREDERICK C. HOLTZ, OF SPRINGFIELD, ILLINOIS, ASSIGNOR TO SANGAMO ELECTRIC COMPANY, OF SPRINGFIELD, ILLINOIS, A CORPORATION OF ILLINOIS.

MAXIMUM DEMAND METER.

Application filed May 23, 1921. Serial No. 471,924.

My invention relates to electricity meters and has particularly to do with integrating meters equipped with auxiliary means for indicating the maximum power or energy consumption during any of a number of equal time intervals making up the usual accounting period. Such meters as heretofore constructed are usually provided with an indicating hand which during the first interval, which may be any suitable predetermined length of time, is advanced over a dial plate at a speed proportionate to the indicating mechanism of the integrating meter. The mechanism which actuates this maximum demand indicator is then automatically reset to its initial position while the indicator remains stationary at the point to which it had been advanced, unless during the next interval the consumption of energy should be greater, in which case the indicator would be correspondingly further advanced until the end of the second interval. This operation is repeated during the remainder of the accounting period, usually a month, and, therefore, obviously, the position of the maximum demand indicator at the end of the accounting period will show the greatest amount of energy consumed during any one of the predetermined periods. At the end of the month the meter reader resets the maximum demand indicator to its initial position and the apparatus then again operates as above described. It is, of course, necessary that in meters of this description the maximum demand indicator be operated correlatively with the integrating meter so that it will indicate correctly the amount of energy consumed during the time while it is being actuated, and it is also highly important that the devices for resetting the actuating mechanism for such indicator shall perform their work as nearly instantaneously as possible to avoid error in the energy consumption registered by said indicator. It is also necessary to so provide for actuating the several operating parts of the maximum demand indicator that they will not impose an appreciable burden upon or interfere with the operation of the integrating meter and thereby impair its accuracy. To provide a maximum demand meter which will meet these requirements and which at the same time will be simple in construction and efficient in operation is the object of my present invention.

This object I accomplish as illustrated in the accompanying drawings and as hereinafter described. What I regard as new is set forth in the claims.

In the accompanying drawings,—

Fig. 1 is an end elevation showing a maximum demand meter attachment which, so far as its fundamental principles of construction are concerned, is well adapted for application to any standard integrating watt-hour meter;

Fig. 2 is a detail being a section on line 2—2 of Fig. 1;

Fig. 3 is a partial vertical section on line 3—3 of Fig. 2;

Figs. 4, 5 and 6 are details illustrating the operation of the resetting devices;

Fig. 7 is a perspective view showing a portion of the resetting arm;

Fig. 8 is a perspective view illustrating the trigger carried by said arm;

Fig. 9 is a front view of the dial plate of a meter showing the maximum demand indicator and the scale associated therewith;

Fig. 10 is a view showing the gear through which the operation of the maximum demand indicator actuating devices is controlled, and also the ratchet wheel and pawl by which resetting of such actuating mechanism independently of the integrating meter is permitted; and Fig. 11 is a perspective view illustrating schematically the relation of the several parts of the apparatus.

Referring first to Fig. 11 for a general description of the combined apparatus going to make up the meter as a whole, 12 indicates the usual driving spindle of an ordinary watt-hour meter, and 13 the usual worm carried by said spindle for actuating the registering train or integrating mechanism, most of which is not illustrated as it is not necessary to an understanding of my present invention. 14 indicates the maximum demand indicator which is preferably in the form of a hand having a hub 15 which is mounted upon a shaft 16. The indicator 14 operates over a scale 17, which in the illustration of Fig. 9 is shown as being secured to the usual dial plate 18 of the watt-hour meter. The hub 15 is provided with an operating arm 19 arranged oppositely to the indicator hand 14 and provided with an anti-friction roller 20. This roller is adapted to be engaged by an arm 21 which is mounted on and keyed to a rock-shaft 22 alined with the shaft 16, the arm 21 being arranged so that by rocking the rock-shaft 22 in a clockwise direction as viewed in Fig. 11 it will move into engagement with the roller 20 and through it swing the indicator 14 in a clockwise direction. Torque is imparted to the rock-shaft 22 tending to rotate it in a clockwise direction by means of a torque member in the form of a spring 23, one end of which is connected to a collar 24 secured to said shaft, the other end of said spring being connected with a fixed part, as the frame 25 of the apparatus. It will be obvious that inasmuch as the spring 23 tends to rotate the shaft 22 in a clockwise direction as viewed in Fig. 11, if said shaft be rotated in the opposite direction the spring 23 will be wound up.

In order to correlate the rotation of the rock-shaft 22 with the integrating meter mechanism said shaft is provided with a ratchet wheel 26 which is keyed thereupon, and with a gear 27 which is loose upon said shaft but is operatively connected therewith by a light spring pawl 28 which engages the ratchet wheel 26. Consequently the shaft 22 cannot rotate independently of the gear 27 in a clockwise direction as viewed in Fig. 11, but said shaft, with the ratchet wheel 26, may be rotated in the opposite direction independently of the gear 27 because in that case the pawl 28 will ride over the teeth of said ratchet wheel. The gear 27 meshes with a pinion 29 which is operatively connected with the worm 13 by a gear 30 and shaft 31. By this construction, as the rate of rotation of the gear 30 and pinion 29 is controlled by the spindle 12 of the watt-hour meter, and the pinion 29 is in mesh with the gear 27, it follows that the latter gear can rotate only at a rate proportionate to the speed of the watt-hour meter, and that as the shaft 22 is caused to rotate in a clockwise direction by means of the spring 23 this controlling connection between said shaft and the spindle 12 does not impose any appreciable load upon the watt-hour meter.

From the foregoing description it will be manifest that when the watt-hour meter is not operating the rock-shaft 22 will also be at rest, but as soon as the watt-hour meter begins to operate the shaft 22 will rotate in a clockwise direction, and if the indicator 14 is then in its initial position, or in other words opposite the zero indication on the scale, said hand will begin to swing to the right as viewed in Figs. 9 and 11, and will continue to so move as long as the rock-shaft 22 continues its rotation in the same direction without being reset. Assuming now for convenience of description that the predetermined time intervals according to which the maximum demand is to be determined are each of five minutes' duration, it is necessary that the indicator be allowed to come to rest at the end of the first five minute period and that the actuating mechanism thereof be returned to its initial position for a fresh start at the beginning of the next period. This resetting mechanism, which is the principal feature of my present invention, will now be described. Loosely mounted upon the shaft 22 is a sleeve 32 to which is fixedly secured a worm wheel 33. This worm wheel meshes with a worm 34 carried by a shaft 35 which carries a second worm wheel 36 meshing with a worm 37 carried by the spindle 38 of an approximately constant speed electric motor 39 which is mounted in the frame 25. This motor is arranged to rotate in such direction as to rotate the worm wheel 33, and consequently the sleeve 32, in a counterclockwise direction as viewed in Fig. 11. It is not believed to be necessary to describe specifically the construction of the motor 39 as any approved motor suitable for the purpose may be employed. The sleeve 32 also carries an eccentric 40 which is fixedly secured thereto, and mounted upon this eccentric is a resetting arm 41 which is connected with one end of a spring 42, the other end of which is connected to the eccentric. The arrangement is such that the rotation of the sleeve 32 and eccentric 40 in a counterclockwise direction as viewed in Fig. 11 while the resetting arm 41 is held stationary, will operate to wind up the spring 42, and consequently said spring tends to rotate the resetting arm 41 in a counterclockwise direction. The spring 42 is sufficiently stronger than the spring 23 to enable the spring 42 to rotate the shaft 22 in a counterclockwise direction against the tension of the spring 23, which operation is necessary as will hereafter be explained.

The resetting arm 41 carries at its outer end a trigger 43, the shape of which is best shown in Fig. 8. This trigger is mounted on a pivot 44 so that it may rock freely, and is provided with a shoulder 45 and with a laterally projecting finger 46, the functions of which will be hereinafter described. The finger 46 is adapted normally to rest upon a stop 47 provided at the outer end portion of the arm 41, as shown in Fig. 7, and it is normally held in this position by a light spring 48, as best shown in Fig. 6. When in this position the finger 46 is so situated as to be adapted to intercept and engage the outer end portion of an arm 49 which is mounted upon and keyed to the rock-shaft 22 adjacent to the eccentric 40, as best shown in Fig. 11, but by rocking the trigger 43 in a clockwise direction to the position shown in full lines in Fig. 3 and by dotted lines in Fig. 4 said finger is lifted high enough to clear the outer end of said arm. As shown in Fig. 7 the arm 41 is provided at its outer end with a shoulder 50 so arranged that when the finger 46 rests on the stop 47, as shown in Figs. 5, 6 and 11, the flat face of the shoulder 45 of the trigger 43 will be slightly in advance of the corresponding face of the shoulder 50, so that by pressing back on the face 45 of the trigger 43 the trigger may be rocked in a clockwise direction as viewed in Fig. 8 sufficiently to carry the finger 46 up to the position shown in Fig. 3 and in dotted lines in Fig. 4. The initial position of the arm 49 is determined by a laterally-projecting pin or stop 51 carried by the frame 25 against which said arm is adapted to bear when in such position, a similar stop 52 being preferably provided at a diametrically opposite point to limit the movement of said arm beyond that point. The resetting arm 41 is arrested at the end of its resetting stroke by a stop 53 in the form of a bar which is secured to the frame of the apparatus in position to intercept the shoulder 50 of said arm and the shoulder 45 of the trigger 43, as will be more fully hereinafter described, and a similar stop 54 is provided at a point diametrically opposite the stop 53 to arrest said arm after its release from stop 53 and hold it stationary while the eccentric 40 makes a half revolution.

Having in mind the structural features above pointed out, it will be readily understood that ordinarily the resetting arm 41 will occupy either the position shown in Fig. 3 or that shown in full lines at the bottom of Fig. 4. That is to say, the shoulders 45, 50 of the trigger 43 and arm 41, respectively, will either be in engagement with the stop 53 or with the stop 54. Under such conditions said shoulders will be at their greatest distance from the axis of the rock-shaft 22, as the eccentric 40 is so adjusted as to accomplish that end. Since with the parts in this position the finger 43 will be raised high enough to clear the arm 49, it will be evident that the shaft 22 will be free to rotate in a clockwise direction carrying with it the arms 49 and 21. At the same time, owing to the constant rotation of the worm wheel 33 under the action of the motor 39, the eccentric 40 will be rotating in a counter-clockwise direction, thereby gradually moving the resetting arm 41 inward or toward the axis of the shaft 22 until ultimately the shoulders 50 and 45 will move far enough to disengage the stop 53 or 54 as the case may be, thereby releasing the arm 41 and permitting it to rotate in a counterclockwise direction under the action of the spring 42. If, when this takes place the arm 41 is in the position shown in dotted lines in Fig. 4, said arm will swing around to the position shown in full lines in said figure where it will be stopped by the stop 54. Here it will remain in readiness for its resetting stroke until the eccentric 40 rotates through an arc of about 180° when it will again be released in the same manner as before and will then rotate into engagement with the stop 53. As the trigger finger 46 resumes its normal or operative position as soon as the trigger clears the stop 53 it will be in position to intercept the arm 49 at whatever position that arm happens to occupy as a result of the clockwise rotation of the shaft 22 during the period just ending, and consequently on its resetting stroke the resetting finger 41 will carry the arm 49 back to its initial position, without, however, affecting the position of the maximum demand indicator. This operation is illustrated in Figs. 4, 5 and 6. At the bottom of Fig. 4 the resetting arm 41 is shown as being in engagement with the stop 54; in Fig. 5 the arm 49, after having been advanced during a predetermined time interval, is about to be engaged by the trigger finger 46; in Fig. 6 the engagement is shown as having taken place; and at the upper part of Fig. 4 the arm 49 is shown as having been returned to its initial position, while the arm 41 and trigger 43 are illustrated in dotted lines in the position which they occupy just as they are being released from the stop 53. As the resetting action of the arm 41 is performed under the torque of the spring 42 and is resisted by the spring 23 connected with the rock-shaft 22, obviously it is necessary that the spring 42 be stronger than the spring 23. The spring 42 is always maintained under the proper tension by the operation of the motor 39, and as the resetting operation accomplishes a rewinding of the spring 23 that spring is also kept under proper tension.

From the foregoing description it will be seen that with the maximum demand indicator 14 in its initial position, when the integrating meter is actuated the consequent rotation of the rock-shaft 22 will effect a corresponding or proportionate movement of said indicator through the action of the arm 21 on the roller 20, and this will continue until the end of the first predetermined period, when, as above described, the direction of rotation of the rock-shaft 22 will be reversed by the resetting mechanism, leaving the indicator 14 at the point to which it has been advanced. Any suitable means may be employed for causing the hand 14 to remain stationary, such as a friction spring arranged to bear on the hub 15 of said indicator. If during the next interval a less amount of current is consumed the arm 21 will not swing far enough to engage the roller 20 so that the indicator 14 will not be advanced, and at the end of that interval the arm 21 will again be reset to its initial position, and the apparatus will continue to operate in this way without advancing the indicator 14 until the energy consumed during any succeeding interval is greater than that consumed during the first interval, whereupon the indicator 14 will be advanced the proper distance to indicate such excess and will then remain in such position until the previous maximum is exceeded. The result is that the position of the indicator 14 at the end of the accounting period will show the maximum energy consumption during any one of the intervals included in the accounting period.

An important advantage of my improved construction is that the resetting operation is performed almost instantaneously, and consequently notwithstanding the fact that the integrating meter may be in operation, as it usually is, at the time of resetting, the resetting is accomplished without impairing the accuracy of the maximum demand indicator, since the actuating devices therefor are practically constantly responsive to the controlling operation of the watt-hour meter, which is not the case in constructions in which any appreciable length of time is required for the resetting operation.

The stop 53 is made in the form of a flat bar for the purpose of holding the trigger finger 46 in its elevated position until after it has passed over the arm 49 in case that arm should be in its initial position at the time of the release of the resetting arm 41 by the action of the eccentric 40, as hereinbefore described, which would be the case if there were no current consumption during that time. The second stop 54 is provided to arrest the resetting arm 41 until the eccentric 40 makes a half rotation, or in other words turns to the position necessary to project the arm 41 so that when it next moves into engagement with the stop 53 its shoulder 50 will engage said stop. As has been explained, the eccentric operates to move the resetting arm 41 radially and said arm engages the stops 53, 54 only when it is projected beyond the point of its mean distance from the axis of the rock-shaft 22. When, therefore, the said arm 41 is released from one of the stops, as 53, by the rotation of said eccentric and swings around into engagement with the opposite stop, as 54, its relation to the eccentric is reversed. It is, therefore, necessary that the eccentric be allowed to move through approximately an arc of 180° while the arm 41 is at rest, so that when said arm is released from the stop 54, for example, the eccentric will then be in position to project it into position to engage the stop 53. The stops 53 and 54 are preferably alike, although it will be evident that the stop 54 need not operate to hold the trigger finger 46 out of operative position as it does not have to pass the arm 49 at that point.

While I have described specifically the embodiment of my invention illustrated in the accompanying drawings, I wish it to be understood that my invention is not limited to such particular construction except in so far as it is specifically claimed, but includes such variations or modifications as would occur to those skilled in the art.

What I claim as my invention and desire to secure by Letters Patent, is—

1. In a maximum demand meter of the type having an indicator, and actuating mechanism therefor correlated with the meter and adapted to be reset independently thereof, a resetting device comprising an approximately constant speed motor, a resetting member, means for actuating said member, a fixed stop adapted to be engaged by said member, and means actuated by said motor and operating to move said member to release it from said stop at regular intervals.

2. In a maximum demand meter of the type having an indicator, and actuating mechanism therefor correlated with the meter and adapted to be reset independently thereof, a resetting device comprising an approximately constant speed motor, a resetting member adapted to rotate, oppositely disposed stops adapted to be alternatively engaged by said member, means actuated by said motor and operating to move said member radially to release it from said stops, and means for rotating said member.

3. In a maximum demand meter of the type having an indicator and actuating mechanism therefor correlated with the meter and adapted to be reset independently thereof, a resetting device comprising an approximately constant speed motor, an eccentric constantly rotated by said motor, and rotatable means the operation of which is controlled by the operation of said eccentric for restoring the indicator-actuating mechanism to its initial position at intervals.

4. In a maximum demand meter of the type having an indicator and actuating mechanism therefor correlated with the meter and adapted to be reset independently thereof, a resetting device, comprising an approximately constant speed motor, a resetting arm, means for rotating said arm, a stop adapted to be engaged by said arm, and an eccentric constantly driven by said motor and operating to release said arm from said stop.

5. In a maximum demand meter of the type having an indicator and actuating mechanism therefor correlated with the meter and adapted to be reset independently thereof, a resetting device comprising an approximately constant speed motor, a resetting arm, a spring for rotating said arm, a stop adapted to be engaged by said arm, and an eccentric constantly driven by said motor and operating to release said arm from said stop.

6. In a maximum demand meter of the type having an indicator and actuating mechanism therefor correlated with the meter and adapted to reset independently thereof, a resetting device comprising an approximately constant speed motor, a resetting arm adapted to rotate, oppositely-disposed stops adapted to be engaged by said arm, an eccentric constantly driven by said motor and operating to release said arm from said stops, and means for rotating said arm.

7. In a maximum demand meter of the type described, a resetting device comprising a rotating support having an eccentric, a stop, a resetting arm loosely mounted on said eccentric and movable thereby into and out of position to be engaged by said stop, means for rotating said support at an approximately constant speed, and means for rotating said arm upon said eccentric.

8. In a maximum demand meter of the type described, a resetting device comprising a rotating support having an eccentric, a stop, a resetting arm loosely mounted on said eccentric and movable thereby into and out of position to be engaged by said stop, means for rotating said support at an approximately constant speed, and a spring connected with said support and with said arm and adapted to rotate said arm upon said eccentric.

9. In a maximum demand meter of the type having an indicator, an actuating device therefor in the form of a rock-shaft having means for actuating said indicator when said shaft is rocked in one direction, and a fixed arm, a resetting device comprising a sleeve mounted on said rock-shaft, means for rotating said sleeve at an approximately-constant speed, a resetting arm carried by said sleeve, means carried by said resetting arm adapted to engage the arm carried by said rock-shaft when the latter is away from its initial position and to pass said arm when the latter is in its initial position, and means for rotating said resetting arm upon said sleeve at regular intervals to return the arm carried by said rock-shaft to its initial position.

10. The combination with a maximum demand indicator-actuating device comprising a rock-shaft, means carried thereby for actuating said indicator, and an arm carried by said rock-shaft, of a resetting device comprising a sleeve loosely mounted on said rock-shaft, an eccentric secured to said sleeve, a resetting arm mounted on said eccentric, a spring connecting said resetting arm with said eccentric and adapted to rotate said arm thereupon, means carried by said resetting arm adapted to engage the arm carried by said rock-shaft when the latter is away from its initial position, a stop for determining the initial position of the latter arm, and a stop for temporarily arresting said resetting arm at the end of its operating stroke.

11. The combination with a maximum demand indicator-actuating device comprising a rock-shaft, means carried thereby for actuating said indicator, and an arm carried by said rock-shaft, of a resetting device comprising a sleeve loosely mounted on said rock-shaft, an eccentric secured to said sleeve, a resetting arm mounted on said eccentric, a spring connecting said resetting arm with said eccentric and adapted to rotate said arm thereupon, means carried by said resetting arm adapted to engage the arm carried by said rock-shaft when the latter is away from its initial position, a stop for determining the initial position of the latter arm, and a stop for temporarily arresting said resetting arm at the end of its operating stroke, said resetting arm being movable out of engagement with said stop by the operation of said eccentric.

12. In a maximum demand meter of the type having an indicator, an actuating device therefor in the form of a rock-shaft having means for actuating said indicator when said shaft is rocked in one direction, and a fixed arm, a resetting device comprising a sleeve mounted on said rock-shaft, means for rotating said sleeve at an approximately-constant speed, a resetting arm carried by said sleeve, a trigger carried by said resetting arm adapted to engage the arm carried by said rock-shaft when the latter is away from its initial position, means for moving said trigger out of operative position when said arm is in its initial position, and means for rotating said resetting arm upon said sleeve at regular intervals to return the arm carried by said rock-shaft to its initial position.

13. In a maximum demand meter of the type having an indicator, an actuating device therefor in the form of a rock-shaft having means for actuating said indicator when said shaft is rocked in one direction, and a fixed arm, a resetting device comprising a sleeve mounted on said rock-shaft, means for rotating said sleeve at an approximately-constant speed, a resetting arm carried by said sleeve, a trigger carried by said resetting arm adapted to engage the arm carried by said rock-shaft when the latter is away from its initial position, a stop for moving said trigger out of operative position when said arm is in its initial position, and means for rotating said resetting arm upon said sleeve at regular intervals to return the arm carried by said rock-shaft to its initial position.

14. In a maximum demand meter of the type having an indicator, and actuating mechanism therefor correlated with the meter and adapted to be reset independently thereof, a resetting device comprising a rotary resetting member, fixed means for normally holding said member against rotation, and means for effecting the operation of said resetting member at regular intervals.

15. In a maximum demand meter of the type having an indicator and actuating mechanism therefor correlated with the meter and adapted to be reset independently thereof, a resetting device comprising a spring-actuated rotary resetting member, fixed means for normally holding said member against operation, and means for effecting the operation of said resetting member at regular intervals.

16. In a maximum demand meter of the type having an indicator, and actuating mechanism therefor correlated with the meter and adapted to be reset independently thereof, a resetting device comprising a rotary resetting member, fixed means for normally holding said member against rotation, a motor, and means actuated by said motor for moving said resetting member out of operative relation to said holding means at regular intervals.

17. In a maximum demand meter of the type having an indicator, and actuating mechanism therefor comprising a rock-shaft movable in one direction under control of the meter to actuate said indicator and in the opposite direction for resetting purposes, a resetting device comprising a resetting member rotatably supported by said rock-shaft, means carried by said rock-shaft and adapted to be actuated by said resetting member to reset said rock-shaft, means for normally holding said resetting member against rotation, and means for releasing said resetting member from said holding means at regular intervals.

18. In a maximum demand meter of the type having an indicator, and actuating mechanism therefor comprising a rock-shaft movable in one direction under control of the meter to actuate said indicator and in the opposite direction for resetting purposes, a resetting device comprising a resetting member rotatably supported by said rock-shaft, means carried by said rock-shaft and adapted to be actuated by said resetting member to reset said rock-shaft, means for normally holding said resetting member against rotation, and means for moving said resetting member to release it from said holding means at regular intervals.

19. In a maximum demand meter of the type having an indicator and actuating mechanism therefor correlated with the meter and adapted to be reset independently thereof, a resetting device comprising a spring-actuated rotary resetting member, a fixed stop for temporarily arresting said resetting member, a motor, and means actuated by said motor for moving said resetting member to release it from said stop at regular intervals.

20. In a maximum demand meter of the type having an indicator and actuating mechanism therefor correlated with the meter and adapted to be reset independently thereof, a resetting device comprising a rotary and radially movable resetting member, a stop for temporarily arresting said resetting member, means for rotating said resetting member, and means for moving said resetting member radially to release it from said stop at regular intervals.

21. In a maximum demand meter of the type having an indicator and actuating mechanism therefor correlated with the meter and adapted to be reset independently thereof, a resetting device comprising a rotary and radially movable resetting member, oppositely-disposed stops adapted to be engaged by said resetting member, means for rotating said resetting member, and means for moving said resetting member radially to release it from one or the other of said stops at regular intervals.

22. In a maximum demand meter of the type having an indicator and actuating mechanism therefor correlated with the meter and adapted to be reset independently thereof, a resetting device comprising a rotary and radially movable resetting member, a stop for temporarily arresting said resetting member, an approximately constant speed motor, and means operated by said motor for moving said resetting member radially to release it from said stop at regular intervals.

23. In a maximum demand meter of the type having an indicator and actuating mechanism therefor correlated with the meter and adapted to be reset independently thereof, a resetting device comprising a rotary and radially movable resetting member, a stop for temporarily arresting said resetting member, an approximately constant speed motor, means operated by said motor for moving said resetting member radially to release it from said stop at regular intervals, and a spring for rotating said resetting member.

24. In an integrating meter, the combination with a maximum demand indicator, and indicator-actuating means comprising a rock-shaft, means operating to actuate said indicator when said shaft is rocked in a forward direction, and a spring for rotating said shaft in a forward direction, of a rotary resetting member for returning said indicator-actuating means to its initial position, and a stronger spring acting in opposition to said first-mentioned spring for rotating said resetting member.

25. In an integrating meter, the combination with a maximum demand indicator, and indicator-actuating means comprising a rock-shaft, means operating to actuate said indicator when said shaft is rocked in a forward direction, and a spring for rotating said shaft in a forward direction, of a rotary resetting member for returning said indicator-actuating means to its initial position, a stronger spring acting in opposition to said first-mentioned spring for rotating said resetting member, and means for maintaining said stronger spring under operative tension.

26. In an integrating meter, the combination with a maximum demand indicator, and indicator-actuating means comprising a rock-shaft, means operating to actuate said indicator when said shaft is rocked in a forward direction, and a spring for rotating said shaft in a forward direction, of a rotary resetting member for returning said indicator-actuating means to its initial position, a stronger spring acting in opposition to said first-mentioned spring for rotating said resetting member, an approximately-constant speed motor, and means actuated by said motor for controlling the operation of said resetting member.

FREDERICK C. HOLTZ.